Feb. 16, 1926.
B. W. WESTBO ET AL
1,573,597
AIR BRAKE LOCK
Filed Sept. 10, 1924      2 Sheets-Sheet 1
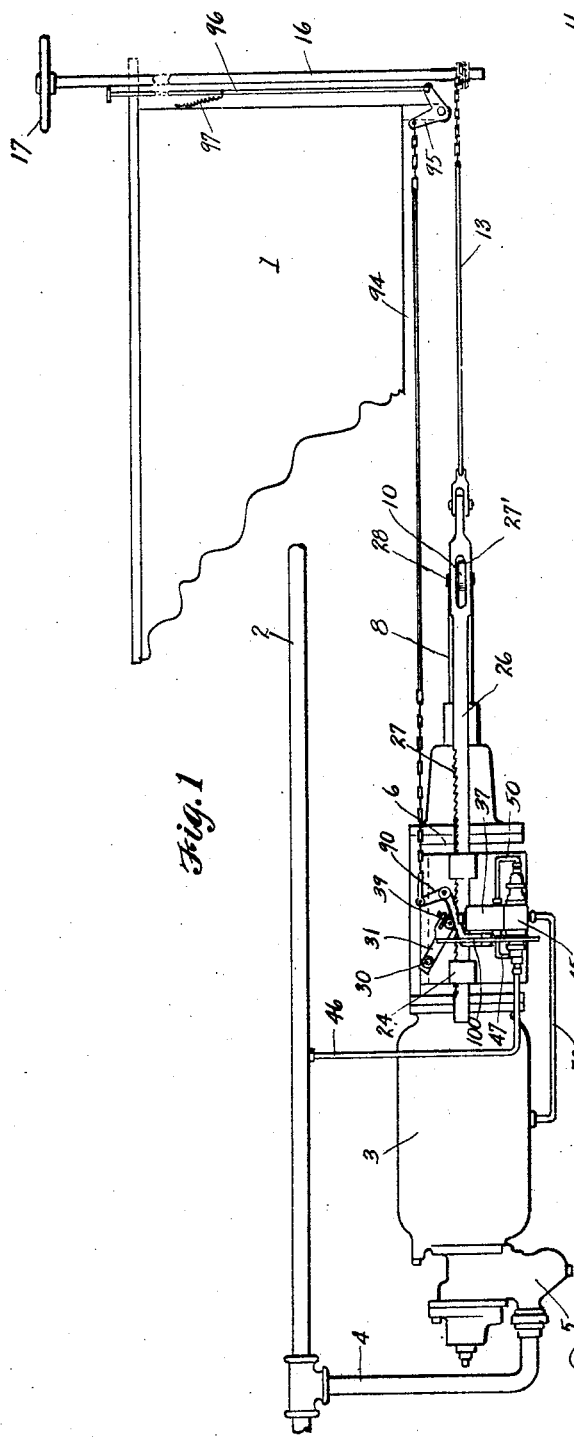
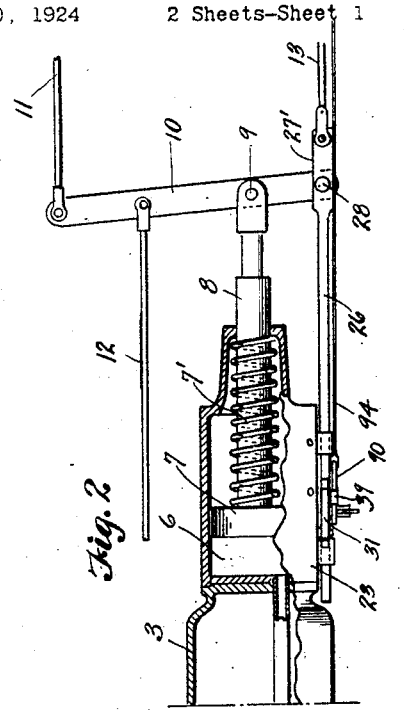
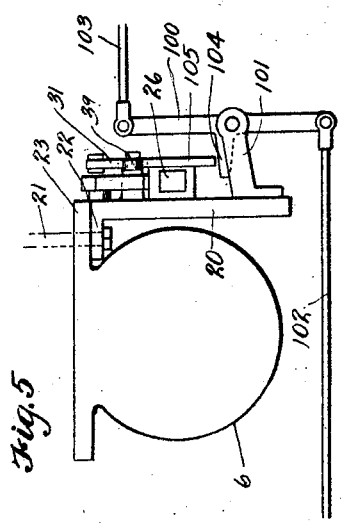
INVENTOR
BERNHARD W. WESTBO
PERCIVAL N. BISSON
BY
Richard J. Cook
ATTORNEY Feb. 16, 1926.

B. W. WESTBO ET AL 1,573,597

AIR BRAKE LOCK

Filed Sept. 10, 1924    2 Sheets-Sheet 2

INVENTOR
BERNHARD W. WESTBO
PERCIVAL N. BISSON
BY
Richard J. Cook
ATTORNEY

Patented Feb. 16, 1926.

1,573,597

UNITED STATES PATENT OFFICE.

BERNHARD W. WESTBO AND PERCIVAL N. BISSON, OF SOUTH PRAIRIE, WASHINGTON, ASSIGNORS TO RAILWAY SAFETY BRAKE LOCK CORPORATION, OF TACOMA, WASHINGTON.

AIR-BRAKE LOCK.

Application filed September 10, 1924. Serial No. 736,854.

*To all whom it may concern:*

Be it known that we, BERNHARD W. WESTBO and PERCIVAL N. BISSON, citizens of the United States, and residents of South Prairie, Pierce County, Washington, have invented certain new and useful Improvements in Air-Brake Locks, of which the following is a specification.

This invention relates to improvements in air brakes and particularly to air brake locks of that character for preventing the release of a brake incidental to a reduction of air pressure in the brake cylinder that might occur because of leakage, exhaustion of supply or accident to pipe connections.

To better explain the purpose of the invention, we will state that the present locking mechanism is intended for use in connection with the air brake as now used on railway rolling stock and which is a combination of parts controlled and operated by compressed air. More specifically stated, such mechanism consists of a source of compressed air supply, a brake valve by means of which an engineer can apply or release the brakes, a brake pipe, or train line, by means of which connection is made between the brake valve and brake apparatus of each car in a train, a brake cylinder by means of which the power stored in compressed air may be transformed into mechanical force to a brake gear consisting of various rods, brake shoes and other required connections whereby the brake shoes may be applied to the wheels of a car to retard it.

In connection with the above parts there is also included for each separate vehicle, an auxiliary reservoir in which a supply of compressed air is stored sufficient to operate the brake on that vehicle, a tripple valve to which the brake pipe, auxiliary reservoir and brake cylinder are connected and which serves to control the flow of air from the brake pipe to the auxiliary reservoir when charging, from the auxiliary reservoir to the brake cylinder when applying and from the brake cylinder to atmosphere when releasing the brake. When the brakes are not being used, the brake pipe and auxiliary reservoir are charged and maintained at a fixed normal pressure. The brakes are applied by reducing the pressure in the brake pipe below that in the auxiliary reservoir. Such a reduction is caused by an opening being made from the brake pipe, or its connections, to atmosphere and may be intentional as when the engineer opens the brake valve or accidentally as in case of the braking of a pipe or hose.

To those familar with train operation, it is known that if a train of cars equipped with air brakes is disconnected from the engine which furnishes the source of air supply, the brakes of all cars will be applied for the reason that opening the train line destroys the equality of brake line and auxiliary reservoir pressure causing the tripple valve of each car to operate to apply the brakes by admitting compressed air from the auxiliary reservoir to the brake cylinder. It is further known that for various reasons, after a brake has been set, the air will gradually leak from the brake cylinder and permit the brake to be released. Then if the train happens to be standing on a grade it may start to roll unless the hand brakes, with which cars are usually equipped, have been set.

It is further known that the air supply of trains sometimes is used faster than it can be supplied. This is most apt to occur with heavy trains operating on long down grades, and when such does occur the hand brakes must be resorted to and depended upon entirely until the supply of air can again be built up.

In view of these undesirable results due to air leakage or exhaustion of supply, it has been the object of this invention to provide automatically operating locking means for use in connection with brakes of the above character that will move into position for holding a brake when set should the pressure of air in the brake cylinders for any reason fall below a certain pre-determined amount and which will move to non-functional position when a safe working pressure has again been built up in the auxiliary reservoir.

Another object of the invention resides in the provision of locking devices, as above stated, that may be manually set or released and which may be installed on the regular brake equipment of railway cars without alteration in the construction or arrangement of such parts as they already exist.

Other objects of the invention reside in the various details of construction and combination of parts of the automatic locking device and in their mode of operation.

In accomplishing these and other objects of the invention, we have provided the improved details of construction, the preferred forms of which are illustrated in the accompanying drawings, wherein—

Figure 1 is a fragmental side elevation of a car having an air brake mechanism equipped with an automatic locking mechanism in accordance with the present invention.

Figure 2 is a plan view of the braking mechanism.

Figure 5 is an end view of the brake mechanism showing the connections for manual release of the lock.

Figure 3:
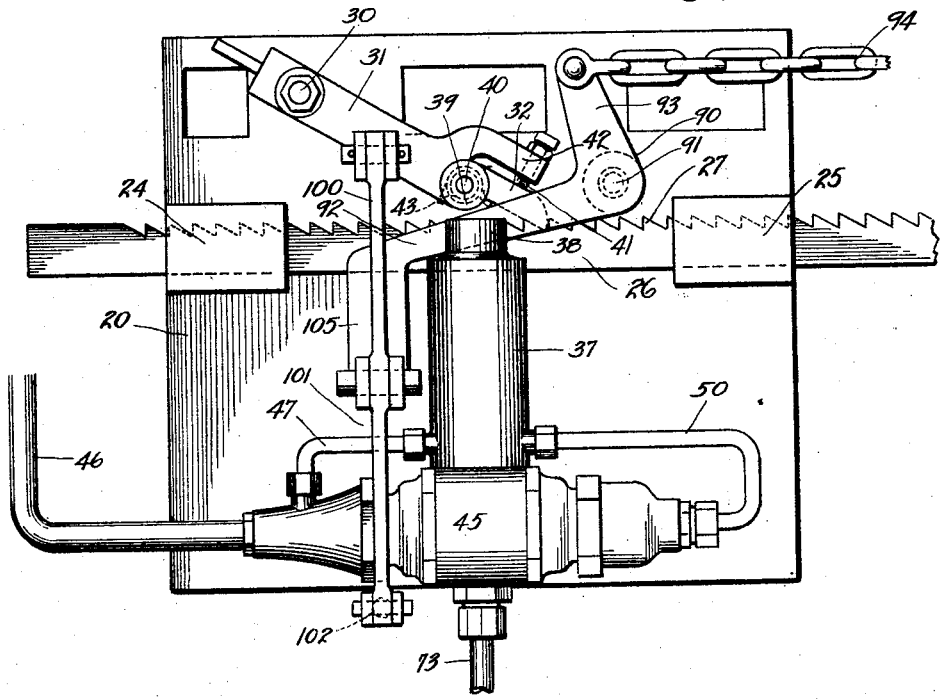
Figure 3 is an enlarged, side view of the locking mechanism.

Referring more in detail to the drawings—

1 designates what may be a railway car, equipped with air brake mechanism of that type in connection with which the present automatic locking device is used. The air brake mechanism is of the usual form now generally used on all railway cars and consists principally of the train pipe 2, through which compressed air is delivered from a source of supply, not shown, along the train to the individual brake mechanism of each car, an auxiliary reservoir 3 that is connected so as to be charged from the train line through a pipe 4 and an interposed tripple valve mechanism, designated at 5 and a car brake cylinder 6 that receives its air from the auxiliary reservoir, under control of the tripple valve.

Within the brake cylinder 6 is a piston 7 adapted to be moved outwardly against the resistance of a coiled spring 7' by the admittance of air to the cylinder and fixed to the piston is a rod 8 which, at its outer end, connects pivotally as at 9, with a lever 10 to which in turn are connected rods or cables 11 and 12 extended to the brake beams or corresponding parts, not shown, at opposite ends of a car and which carry brake shoes that are adapted to be pressed into engagement with the car wheels when it is desired to retard or stop the car. The piston rod 8 connects with the lever 10 at a point approximately two-thirds of the distance between its ends and the rods 11 and 12 are pivotally attached to the lever, respectively, at the extreme end of the longer section and intermediate this end and the pivot connection with the piston rod, the parts operate so that when air is admitted from the auxiliary reservoir to cylinder 6 which drives piston 7 and rod 8 outwardly, the lever 10 is so moved as to cause braking tension on both rods 11 and 12.

The locking mechanism embodied by the present invention is mounted upon a base plate 20 which is vertically disposed against the side of brake cylinder 6 and is fixed thereto by means of bolts 21 extended through a laterally turned flange 22 along the top edge of the plate and a supporting flange 23 formed integral with the cylinder 6. These bolts may also serve to support the brake cylinder from the car structure.

Cast integral with the plate 20 at its opposite side edges are guides 24 and 25 through which a lock bar 26 is slidably extended. Along its upper edge the bar is provided with ratchet teeth 27 and near one end it has a loop 27' into which one end of the brake lever 10 extends and wherein it is fixed by a pivot pin 28. The connection and mounting of the parts is so arranged that the lock bar slides back and forth in its mountings in accordance with the movement of the lever 10 as influenced by the hand or air brake.

To the outer end of the lock bar 26 a cable 13 is attached which extends to the hand brake shaft 16 at the end of the car. This cable may be wound on the shaft by rotation of the brake wheel 17 at its upper end if it is desired to set the brake by hand.

Pivotally fixed to the base plate 20 by means of a bolt 30 is a locking dog 31 having a pivotally mounted pawl 32 at its end adapted to holdingly engage with the teeth 27 of the locking bar. Normally, that is when there is sufficient air pressure in the auxiliary reservoir 3 to hold the brakes set, the locking means is not needed and the pawl is held disengaged from the teeth of the locking bar by means presently described, but as soon as this pressure approaches the point at which it will become insufficient to hold the brake, the pawl is permitted to move into holding engagement with the teeth of the lock bar so that the latter cannot move inwardly and the brake beam will be held thereby so that the brakes cannot be released.

Figure 4:
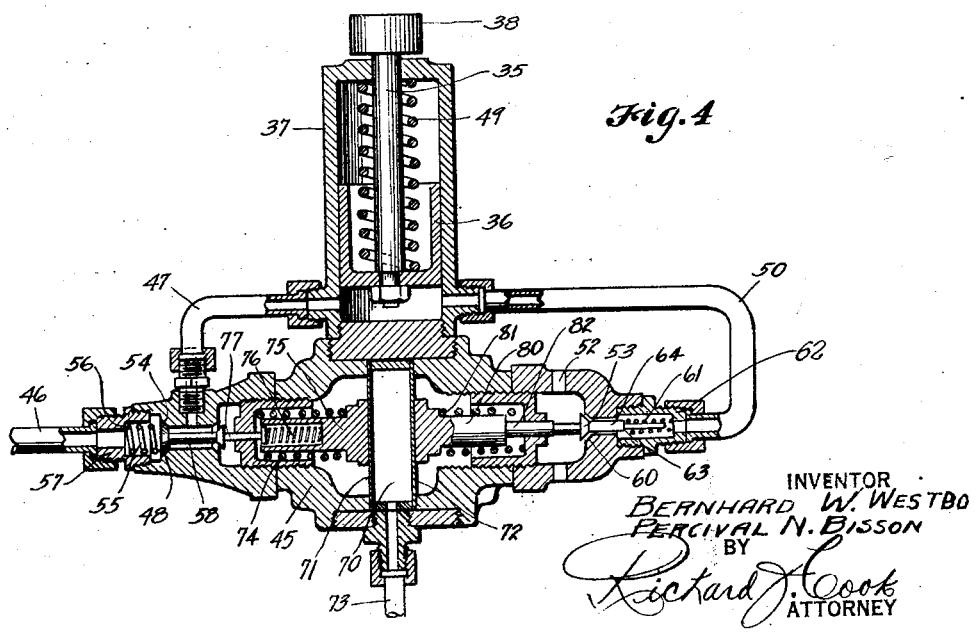
Figure 4 is an enlarged sectional view of the air controlled valve mechanism for controlling movement of the locking dog with respect to the locking ratchet.

The means just referred to for controlling movement of the locking dog, as best shown in Figures 3 and 4, consists of a plunger 35 connected at its lower end with a piston 36 operable in an air cylinder 37 under the control of air from the auxiliary reservoir. At the upper end of the plunger is a head 38 adapted, when the plunger is extended, to engage with a roller 39 supported by a pin 40 from the dog to thereby lift the dog and locking pawl from the rack teeth. When the plunger retracts, the dog is free to move to permit the pawl to lock with the rack bar.

An important feature of the invention resides in the construction and manner of mounting the pawl on the locking dog which permits it to be easily released regardless of the amount of holding pressure against it. The pawl is pivotally mounted on the pin 40 that mounts the roller 39. Its upward pivotal movement is limited by contact with an adjusting screw 41 that is threaded through an extension 42 from the end of the dog overlying the pawl. A coiled spring 43 located about the pin 40 bears against the pawl to retain it yieldingly in place but when pressure is exerted by the plunger upwardly against the roller the locking device will hinge upwardly at the pivot point 40 and thus the lock bar will be released. As soon as the pawl is disengaged from the rack, the spring 43 brings it back to normal position. Without this feature of construction, an excessive amount of pressure would be required to release the pawl if there is any tension on the brake beam.

The air cylinder 37 is mounted on a valve housing 45 supported from the plate 20 and connected with one end of this housing is a pipe 46 leading from the train pipe 2. A pipe 47 connects with the lower end of cylinder 37 and with the valve housing and interposed in the housing between the connections therewith of pipes 46 and 47 is a valve 48 that controls the flow of air from the train pipe to the cylinder 37. When the pressure of air in cylinder 37 falls below a certain pre-determined amount, the piston 36 will be moved to its lower limit of travel and the plunger retracted by means of a coiled spring 49 enclosed within the cylinder and bearing downwardly against the piston, but when the train line is charged to a certain desirable operating pressure and this pressure is admitted through pipes 46 and 47 to the cylinder 37, the plunger will be extended.

An air exhaust pipe 50 connects with the lower end of the cylinder 37 and to the end of the valve housing 45 opposite that to which pipe 46 is connected. This pipe communicates with a chamber 51 in the housing provided with exhaust ports 52. A valve 53 interposed in the housing between chamber 51 and pipe connection 50 controls the flow of air from the cylinder.

The valve 48 is of conical form and is adapted to a seat 54 in the housing against which it is yieldingly held by a coiled spring 55 that bears against its outer side and against a seat 56 in a nipple 57 threaded into the housing. A variation in the holding tension of the spring is obtained by adjustment of the nipple. The valve also has an inwardly extending stem 58 by means of which it is moved to open position, as will presently be described.

The valve 53 likewise is of conical form and is adapted to a seat 60. A spring 61 contained within a nipple 62 bears against a shoulder 63 on the stem 64 of the latter valve to yieldingly retain it open and the tension of this spring may be varied by adjustment of the nipple.

Centrally of the housing 45 is a chamber 70, closed at its opposite sides by flexible diaphragms 71 and 72 and a conduit 73 connects this chamber with the auxiliary reservoir 3. By this connection an equality of pressure is maintained in the reservoir and chamber. Slidably mounted in the housing and held against the outer face of diaphragm 71 by means of a spring 74, is a hollow plunger 75 and a coiled spring 76 contained within the plunger bears against the inner end of a slidably mounted pin 77 which at its outer end, engages the stem 58 of valve 48. Likewise a plunger 80 is located in the other end of the valve housing which is held with its inner end against the outer face of diaphragm 72 by a coiled spring 81 and at its outer end it has a stem 82 adapted to engage with the valve 53.

The two plungers 75 and 80 move outwardly and inwardly in accordance with contraction or expansion of the diaphragms with which they connect and the diaphragms move outwardly or inwardly in accordance with the pressure of air in chamber 70 which, by virtue of pipe connection 73, is maintained the same as that in the auxiliary reservoir.

With the parts so constructed, it will operate as follows: When the auxiliary reservoir is charged to a suitable working pressure, this pressure will be communicated to chamber 70 through pipe 73 and the diaphragms 71 and 72 will be expanded so that by the means previously described, the valve 48 will be opened and valve 53 will be closed. The opening of valve 48 permits a flow of compressed air from the train line to pass into cylinder 37 to extend the plunger 35 so that the locking dog is held disengaged from the lock bar. Thus, so long as there is a certain desired working pressure of air in the auxiliary reservoir, the brake operates the same as if the present attachment was not used.

Assuming then that the brake of a car has been set by air and that for some reason such as a leakage or exhaustion of supply, the pressure of air in the auxiliary reservoir approaches a point at which it would be insufficient to hold the brakes set. When this condition is reached, the valve 48 in housing 45 closes and valve 53 opens for the reason that air pressure in chamber 70 decreases in accordance with that in the reservoir 3 and when it falls to a certain pre-determined amount the diaphragms 70 and 71 will have contracted or moved inwardly and permitted the valves to operate as above stated. The closing of valve 48 cuts off any supply of air from the train line and the opening of valve 53 permits air to escape from cylinder 37 so that the plunger will retract and the locking dog will drop into locking engagement with the lock bar and hold it against release movement.

When the auxiliary reservoir is recharged to a desirable pressure, the diaphragms will be expanded so that valve 48 will be opened and valve 53 closed. Air will then flow from the train line into cylinder 37 and move the piston and plunger so as to again release the dog.

For the purpose of manually releasing the dog from the lock bar by a person on top of the car, we have provided a bell crank lever 90 that is pivotally fixed by a bolt 91 to plate 20. This crank has an arm 92 extended beneath the roller 39 on the dog 31 and another arm 93 extending upwardly to which a chain 94 is attached. This chain connects with one arm of a bell crank 95 pivotally mounted at the end of the car. A rod 96 is fixed to this latter crank and extends upwardly through suitable guides to a point adjacent the hand brake wheel. By pressing downwardly on this rod the crank arm 92 will be thrown upwardly against roller 39 to disengage the pawl 32 from the teeth of the rack or lock bar. A spring 97 connected with rod 96 returns it to normal position.

To permit the manual release of the lock by a person at either side of the car, we have provided a release lever 100 that is pivotally supported centrally by means of a bracket 101 from plate 20. Rods 102 and 103 are attached to its opposite ends and these are extended to opposite sides of the car. An arm 104 extends from the lever 100 and is adapted to be moved into lifting engagement with a downturned end portion 105 of lever arm 92 of bell crank 90 by outward pull on either rod 102 or 103, to thereby cause arm 92 to lift the locking dog by engagement with roller 39.

When the car is entirely disconnected from a source of compressed air, the brakes may be operated by the hand brake in the usual manner and will be locked when set by the present locking device.

Having thus described our invention, what we claim as new therein and desire to secure by Letters-Patent, is:

1. The combination with an air brake mechanism of the character described including a train pipe, an auxiliary supply reservoir and a brake lever, of a normally disengaged locking means for the brake lever adapted to be set under the control of air pressure in the train pipe and to be released under control of air pressure in the auxiliary reservoir.

2. The combination with an air brake mechanism of the class described including a train pipe, an auxiliary reservoir and a brake lever, of locking mechanism for the brake lever whereby the brakes may be retained set, means operable by the pressure of air in the train line for retaining the locking mechanism in non-functional position and other means operable under the control of air in the auxiliary reservoir for controlling the operation of the first mentioned means.

3. In a device of the class described, the combination with an air brake system including a train pipe, an auxiliary reservoir, a brake cylinder, a piston in said cylinder and a brake lever connected with said piston, of a lock bar attached to said lever, a pawl adapted to lock with the bar to retain the brakes set and means operable under the control of pressure within the auxiliary reservoir for normally retaining the pawl disengaged from the lock bar but which permits it to move into locking engagement with the bar when pressure within the reservoir falls below a predetermined amount.

4. In a device of the class described, the combination with an air brake system including a train pipe, an auxiliary reservoir, a brake cylinder, a piston in the brake cylinder, a piston rod connected with the piston and with a brake actuating lever of a toothed lock bar connected with the said lever, a pawl adapted for locking engagement with said bar, an air cylinder, a piston in said cylinder, a plunger attached to the piston, means connecting the air cylinder with the train pipe whereby air pressure from the latter will extend the piston and its plunger against the pawl to retain the latter disengaged from the lock bar and valve mechanism operable under the control of pressure of air in the auxiliary reservoir for releasing or admitting air into the air cylinder for the purpose of releasing or setting the locking pawl.

5. In a device of the class described, the combination with an air brake system including a train pipe, an auxiliary reservoir, a brake cylinder, a piston in the brake cylinder, a piston rod connected with the piston and with a brake actuating lever of a toothed lock bar connected with the said lever, a pawl adapted for locking engagement with said bar, an air cylinder, a piston in said cylinder, a plunger attached to the piston, a yieldable means for normally retaining the plunger in retracted position, a conduit connecting the air cylinder and train pipe, a valve operable to control the flow of air through said conduit and means operable under the control of air pressure in the auxiliary reservoir for opening said valve to admit air to said air cylinder when pressure in the reservoir exceeds a certain predetermined amount to thereby move the piston to extend the plunger and to retain the locking pawl released from the lock bar and operable to close said valve and release air from the air cylinder when the pressure in the auxiliary reservoir falls below a certain predetermined amount to thereby allow the pawl to lock with the lock bar.

6. In a device of the class described, the combination with an air brake system including a train pipe, an auxiliary reservoir, a brake cylinder, a piston in the brake cylinder, a brake actuating lever and a piston rod connecting the piston and lever, of a toothed lock bar attached to the brake lever, a pivotal pawl adapted to engage with the bar to lock the brakes, an air cylinder, a conduit connecting said cylinder and train pipe, a piston in said cylinder operable by the admittance of air from the train pipe to release the pawl from the lock bar and a valve mechanism operable under the control of air under pressure in the auxiliary reservoir for admitting air into and releasing it from the air cylinder.

7. In a device of the class described, the combination with an air brake system including a train pipe, an auxiliary reservoir, a brake cylinder, a piston in the brake cylinder, a brake actuating lever and a piston rod connecting the piston and lever, of a toothed lock bar attached to the brake lever, a pawl adapted to engage with the bar to lock the brakes, an air cylinder, a conduit connecting said cylinder and train pipe, valve mechanism for controlling the flow of air through said conduit into the air cylinder, another valve mechanism operable to control the exhaustion of air from the cylinder, and a control mechanism operable under the influence of air pressure in the auxiliary reservoir for controlling said valve mechanisms.

8. In a device of the class described, the combination with an air brake system including a train pipe, an auxiliary reservoir, a brake cylinder, a piston in the brake cylinder, a brake actuating lever and a piston rod connecting the piston and lever of a toothed lock bar attached to the brake lever, a locking pawl movable from and into locking relation with said bar, means operable automatically under the control of air pressure within the auxiliary reservoir for actuating the pawl between released and locking relation with the lock bar and manually operable means for releasing the pawl from the lock bar.

9. In a device of the class described, the combination with an air brake system including a train pipe, an auxiliary reservoir, a brake cylinder, a piston in the brake cylinder, a brake actuating lever and a piston rod connecting the piston and lever of a toothed lock bar attached to the brake lever, a pivoted locking pawl movable from and into locking relation with said bar, an air cylinder, a piston in said cylinder, a plunger attached to the piston and extendable from the cylinder to release the pawl from the lock bar, a conduit connecting the air cylinder and train line whereby air admitted under pressure from the train line will extend the plunger to release the pawl, a control valve in said conduit, an exhaust conduit for the air cylinder, a control valve in said exhaust conduit and actuating mechanism for said control valves including a chamber with yieldable diaphragms forming walls thereof and operatively connected with the valves and a conduit connecting said chamber with the auxiliary reservoir whereby a variation of pressure of air within the latter effects contraction or expansion of said diaphragms to open or close said valves.

10. In a device of the class described, the combination with an air brake system including a train pipe, an auxiliary reservoir, a brake cylinder, a piston in the brake cylinder, and a brake actuating lever of a toothed lock bar attached to the brake lever, a pivoted locking pawl movable from and into locking relation with said bar, an air cylinder, a piston in said cylinder, a plunger attached to the piston and extendable from the cylinder to release the pawl from the lock bar, a conduit connecting the air cylinder and train line whereby air admitted under pressure from the train line will extend the plunger to release the pawl, a control valve in said conduit, an exhaust conduit for the air cylinder, a control valve in said exhaust conduit and actuating mechanism for said control valves including a chamber with yieldable diaphragms forming walls thereof and operatively connected with the valves and a conduit connecting said chamber with the auxiliary reservoir whereby a variation of pressure of air within the latter effects contraction or expansion of said diaphragms to open or close said valves, and adjustable means for varying the degree of expansion of the diaphragms required for actuating the control valve mechanisms.

Signed at Tacoma, Pierce County, Washington, this 14th day of July 1924.

BERNHARD W. WESTBO.
PERCIVAL N. BISSON.